(12) United States Patent
Dai et al.

(10) Patent No.: US 8,451,790 B2
(45) Date of Patent: May 28, 2013

(54) METHOD AND SYSTEM FOR TRANSMITTING DOWNLINK CONTROL INFORMATION

(75) Inventors: Bo Dai, Guangdong Province (CN);
Weijun Li, Guangdong Province (CN);
Guanghui Yu, Guangdong Province (CN); Zhisong Zuo, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,773

(22) PCT Filed: Jun. 30, 2010

(86) PCT No.: PCT/CN2010/074857
§ 371 (c)(1),
(2), (4) Date: Mar. 30, 2012

(87) PCT Pub. No.: WO2010/145620
PCT Pub. Date: Dec. 23, 2010

(65) Prior Publication Data
US 2012/0207103 A1      Aug. 16, 2012

(30) Foreign Application Priority Data

Nov. 2, 2009  (CN) .......................... 2009 1 0176098

(51) Int. Cl.
*H04W 72/04*   (2009.01)
*H04J 1/00*    (2006.01)
*H04L 12/26*   (2006.01)

(52) U.S. Cl.
USPC ........... 370/329; 370/281; 370/343; 370/437; 370/252; 455/450

(58) Field of Classification Search
USPC ................. 370/203, 206, 208, 210, 328, 329, 370/330, 335–337, 479–480
See application file for complete search history.

(56) References Cited

U.S. PATENT DOCUMENTS

| 2010/0118720 A1* | 5/2010 | Gauvreau et al. ............ 370/252 |
| 2010/0165847 A1* | 7/2010 | Kamuf et al. ................. 370/241 |

(Continued)

FOREIGN PATENT DOCUMENTS

| CN | 101060699 A | 10/2007 |
| CN | 101478808 A | 7/2009 |

(Continued)

OTHER PUBLICATIONS

International Search Report for PCT/CN2010/074857 dated Sep. 10, 2010.

*Primary Examiner* — Candal Elpenord
(74) *Attorney, Agent, or Firm* — Ling Wu; Stephan Yang; Ling and Yang Intellectual Property (57) ABSTRACT

The present invention discloses a method and a system for transmitting downlink control information, wherein when a base station is not configured with a carrier indicator field, the base station transmits a physical downlink control channel bearing the corresponding downlink control information on each downlink component carrier in a user equipment's physical downlink shared channel (PDSCH) carrier set, and the user equipment detects the corresponding downlink control information on each downlink component carrier in the configured PDSCH carrier set. When a base station is configured with a carrier indicator field, the base station transmits the physical downlink control channel bearing the corresponding downlink control information on each downlink component carrier in the configured physical downlink control channel (PDCCH) carrier set, and the user equipment detects the corresponding downlink control information on each downlink component carrier in the PDCCH carrier set.

13 Claims, 1 Drawing Sheet

U.S. PATENT DOCUMENTS

| | | | | |
|---|---|---|---|---|
| 2010/0232373 A1* | 9/2010 | Nory et al. | | 370/329 |
| 2010/0254329 A1* | 10/2010 | Pan et al. | | 370/329 |
| 2010/0254688 A1* | 10/2010 | Masuda | | 396/55 |
| 2010/0272017 A1* | 10/2010 | Terry et al. | | 370/328 |
| 2010/0322158 A1* | 12/2010 | Lee et al. | | 370/329 |
| 2011/0076962 A1* | 3/2011 | Chen et al. | | 455/68 |
| 2011/0299489 A1* | 12/2011 | Kim et al. | | 370/329 |
| 2012/0044921 A1* | 2/2012 | Chung et al. | | 370/338 |
| 2012/0230239 A1* | 9/2012 | Park et al. | | 370/311 |

FOREIGN PATENT DOCUMENTS

| | | |
|---|---|---|
| CN | 101516104 A | 8/2009 |
| CN | 101714892 A | 5/2010 |
| EP | 1855424 A1 | 11/2007 |

\* cited by examiner

METHOD AND SYSTEM FOR TRANSMITTING DOWNLINK CONTROL INFORMATION

TECHNICAL FIELD

The present invention relates to the field of mobile wireless communications, and more especially, to a method and a system for transmitting downlink control information in a wireless communication system.

BACKGROUND OF THE RELATED ART

The Radio Frames in the Long Term Evolution (LTE) system include frame structures of the Frequency Division Duplex (FDD) mode and the Time Division Duplex (TDD) mode.

Figure 1:
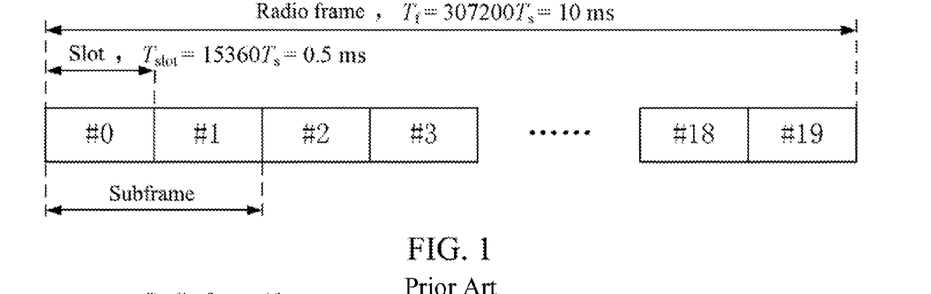
FIG. 1 is a schematic diagram of the frame structure of the FDD mode in the prior art.

The frame structure of the FDD mode is shown in FIG. 1, a 10 ms radio frame is composed of 20 0.5 ms slots that are numbered as 0~19, and the slots $2i$ and $2i+1$ compose of the 1 ms subframe i.

Figure 2:
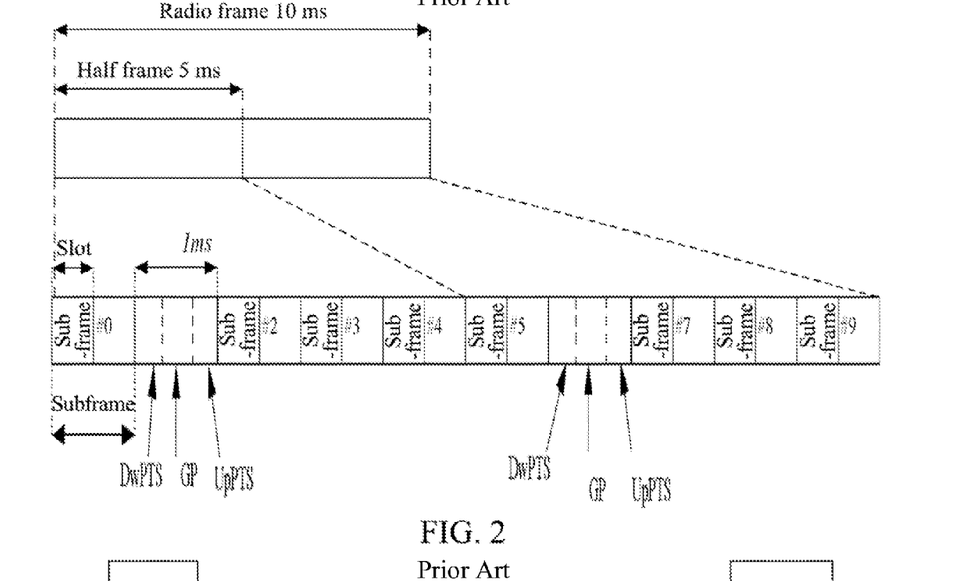
FIG. 2 is a schematic diagram of the frame structure of the TDD mode in the prior art.

The frame structure of the TDD mode is shown in FIG. 2, a 10 ms radio frame is composed of 2 5 ms half frames, one half frame comprises 5 1 ms subframes, and the subframe i is defined as two 0.5 ms slots $2i$ and $2i+1$.

In the aforementioned two frame structures, for the standard Normal Cyclic Prefix (Normal CP), one slot contains 7 66.7 us symbols, wherein the length of the CP of the first symbol is 5.21 us, and the length of the rest 6 symbols is 4.69 us; for the Extended Cyclic Prefix (Extended CP), one slot contains 6 symbols, and the length of the CP of all the symbols is 16.67 us.

The LTE system also defines the following three kinds of downlink physical control channels: the Physical Control Format Indicator Channel (PCFICH); the Physical Hybrid Automatic Retransmission Request Indicator Channel (PHICH); the Physical Downlink Control Channel (PDCCH), wherein:

(1) the information born on the PCFICH is used to indicate the number of Orthogonal Frequency Division Multiplexing (OFDM) symbols for transmitting the PDCCH in one subframe, it is transmitted in the first OFDM symbol of the subframe, and all the frequency locations are determined according to the system downlink bandwidth and cell Identity (ID).

(2) The PHICH is used to bear the Acknowledgement/Negative Acknowledgement (ACK/NACK) feedback information of the uplink transmission data. The number of PHICHs and the time-frequency locations are determined by the system messages and cell ID in the Physical Broadcast Channel (PBCH) of the downlink carrier where the PHICH is located.

(3) The PDCCH is used to bear the Downlink Control Information (DCI), including: uplink and downlink scheduling information, as well as uplink power control information. The PDCCH DCI format (format) is divided into: DCI format 0, DCI format 1, DCI format 1A, DCI format 1B, DCI format 1C, DCI format 1D, DCI format 2, DCI format 2A, DCI format 3, and DCI format 3A, and so on; wherein:

the DCI format 0 is used to indicate the scheduling of the Physical Uplink Shared Channel (PUSCH);

the DCI format 1, the DCI format 1A, the DCI format 1B, the DCI format 1C, and the DCI format 1D are used to indicate different modes of one PDSCH codeword scheduling;

the DCI format 2 and the DCI format 2A are used to indicate different modes of the space division multiplexing;

the DCI format 3 and the DCI format 3A are used to indicate different modes of the power control instructions of the Physical Uplink Control Channel (PUCCH) and the PUSCH.

The PDCCH search space is divided into a common search space and a UE-specific search space, and the common search space is the space that all the UEs need to search, and the UE-specific search space is the specific search space for one UE. Both the common search space and the UE-specific search space correspond to respective DCI Formats. The UE respectively detects the corresponding downlink control information in the common search space and the UE-specific search space in accordance with the corresponding DCI Formats.

The PDCCH corresponds to four levels that are also known as four PDCCH Formats, respectively corresponding to 1 Control Channel Element (CCE), 2 CCEs, 4 CCEs and 8 CCEs.

The protocol of the LTE whose version corresponds to the Release (R) 8 defines six kinds of bandwidths as follows: 1.4 MHz, 3 MHz, 5 MHz, 10 MHz, 15 MHz and 20 MHz. The ITE-Advanced (Further Advancements for E-UTRA) is the evolved version of the LTE Release-8. The ITE-Advanced should also meet or exceed the requirements of IMT-Advanced proposed by the International Telecommunication Union (ITU-R) besides meeting or exceeding the 3rd Generation Partnership Project (3GPP) TR 25.913: "requirements for Evolved Universal Telecommunication Radio Access (Evolved UTRA) and Evolved Universal Telecommunication Radio Access Network (Evolved UTRAN)".

The requirements of the backward compatible with the LTE Release-8 refer that: the LTE Release-8 terminal can work in the LTE-Advanced network; the LTE-Advanced terminal can work in the LTE Release-8 network.

In addition, the LTE-Advanced should work in different size spectrum configurations, including working in spectrum configuration (such as the 100 MHz continuous spectrum resources) wider than that of the LTE Release-8 so as to achieve higher performances and target peak rates. Take into account the compatibility with the LTE Release-8, for a bandwidth larger than 20 MHz, the carrier aggregation way is used, namely:

two or more component carriers are aggregated to support downlink transmission bandwidth larger than 20 MHz; and the terminal can receive one or more component carriers at the same time according to its capability.

The LTE-A terminal with a receiving capability more than 20 MHz bandwidth is capable of simultaneously receiving the transmission on a plurality of carrier components. The LTE Rel-8 terminal can only receive the transmission on one component carrier, and the structure of the component carrier follows the Rel-8 specification.

At present, the downlink control signaling transmission, that is the form of the Physical Downlink Control Channel (PDCCH), in the LTE-Advanced standard has the following conclusions:

Define a User Equipment (UE) specified Downlink Component Carrier Set used for transmitting the Physical Downlink Shared Channel (PDSCH) scheduled to the target UE, and the carrier set is notified with a special signal.

Backward compatible carrier can allow the access of the UEs of all the existing LTE versions, and can operate in the form of single-carrier (stand-alone) or act as a part of spectrum aggregation. For the FDD, the backward compatible carriers always appear in pairs, that is, downlink (DL) and uplink (UL).

Non-backward compatible carrier can be defined as allowing the access of the UE of the LTE version of such a kind of carriers if defined, but cannot allow the access of the UE of the LTE R8 version. If the non-compatibility is derived from the frequency multiplexing distance, the non-backward compatible carrier operates in the form of single-carrier (stand-alone), or acts as a part of the spectrum aggregation.

Extended carrier: cannot operate in the form of single carrier if defined, but must be a composition part of a carrier group, and at least one carrier in the carrier group is able to operate in the form of single-carrier (stand-alone).

The PDCCHs on one component carrier indicates the PDSCH resources of the same component carrier and the PUSCH resources of the only one connected uplink component carrier.

There is no carrier indicator field in the DCI format
  i.e., the PDCCH structure (the same encoding and the same CCE based resource mapping) and DCI formats in the Rel-8 version.

The PDCCHs on one component carrier use the carrier indicator field to indicate the PDSCH or PUSCH resources of one component carrier in multiple component carriers.

The extended 1 to 3 bits carrier indicator field (CI) in the DCI formats in the Rel-8
  reuses the Rel-8 PDCCH structure (the same encoding and the same CCE based resource mapping).

It needs to study the solution of the detection error of the PCFICH of the component carrier bearing the PDSCH The existence of the carrier indicator (CI) field is configured semi-statically.

When the extended carrier scheduling is allowed, since each carrier might correspond to different DCI Format types, the UE needs to perform large amount of blind detection on the downlink component carrier to be detected to determine the downlink control information transmission condition configured by the base station, which increases the implementation complexity and results in the system performance degradation. In addition, due to the introduction of cross-carrier scheduling, it means that the downlink control information configured by the base station can be centralized on one or more downlink component carriers in the UE specific downlink component carrier set to be transmitted.

Due to the introduction of cross-carrier scheduling and carrier aggregation, there are problems that the number of blind detections will increase and how to transmit and detect the multi-carrier downlink control information, and so on.

SUMMARY OF THE INVENTION

The technical problem to be solved in the present invention is to provide a method and a system for transmitting downlink control information so as to implement to transmit and detect the downlink control information in multiple carriers, and to overcome the defect that the number of blind detections increases.

In order to solve the aforementioned problem, the present invention provides a method for transmitting downlink control information, comprising:

when a base station is not configured with a carrier indicator field, the base station transmitting a physical downlink control channel bearing corresponding downlink control information on each downlink component carrier in a user equipment (UE)'s physical downlink shared channel carrier set, and a UE detecting the corresponding downlink control information on each downlink component carrier in the physical downlink shared channel carrier set, wherein the physical downlink shared channel carrier set is configured by the base station.

The method further comprises:

when the base station is configured with a carrier indicator field, the base station transmitting a physical downlink control channel bearing the corresponding downlink control information on each downlink component carrier in a configured physical downlink shared channel carrier set, and the UE detecting the corresponding downlink control information on each downlink component carrier in a physical downlink control channel carrier set, wherein the physical downlink control channel carrier set is configured by the base station.

The physical downlink control channel carrier set is a sub-set of backward compatible carriers and non-backward compatible carriers in a UE-specific downlink component carrier set; or the physical downlink control channel carrier set is divided into a UE-specific downlink control information carrier set and a public downlink control information carrier set to respectively indicate the downlink component carriers of the UE-specific downlink control information and public downlink control information that the UE needs to detect.

When the base station is configured with a carrier indicator field, in the step of the base station transmitting the physical downlink control channel bearing the corresponding downlink control information on each downlink component carrier in the configured physical downlink control channel carrier set, the base station transmits the corresponding downlink control information on each downlink component carrier in the configured physical downlink control channel carrier set;

in the step of the user equipment detecting the corresponding downlink control information on each downlink component carrier in the physical downlink control channel carrier set, the UE detecting the corresponding downlink control information in a common search space and a UE-specific search space of each downlink component carrier in the configured physical downlink control channel carrier set.

Preferably, in the step that the UE detects the corresponding downlink control information on each downlink component carrier in the physical downlink shared channel carrier set, the UE detecting the corresponding downlink control information on the common search space of backward compatible carriers and non-backward compatible carriers in the physical downlink shared channel carrier set.

In the step that the base station transmits the physical downlink control channel bearing the corresponding downlink control information, if the downlink component carrier is performed by cross-carrier scheduling, the component carrier is configured by taking a component carrier as a unit in the cross-carrier scheduling.

For the cross-carrier scheduled downlink component carrier, the downlink control information format of the common search space of the downlink component carrier does not contain a carrier indicator field and only indicates the downlink component carrier scheduling information, and the downlink control information format of the UE-specific search space of the downlink component carrier contains the carrier indicator field; or for the cross-carrier scheduled downlink component carrier, the common search space of the downlink component carrier does not bear said UE-specific downlink control information format; the downlink control message format of the UE-specific search space of the downlink component carrier contains the carrier indicator field.

In the step that the UE detects the downlink control information, a search space of each downlink component carrier is determined by a search space method in a Long Term Evolution Release 8 (LTE R8) standard; alternatively, if the UE is a LTE R10 standard UE, the search space on each downlink component carrier of the LTE R10 standard UE is determined according to an index of the downlink component carrier.

The format of the corresponding downlink control information on a downlink component carrier to be detected is notified to the UE by the base station using higher layer signaling; or the downlink control information format is divided into a plurality of different downlink control information format groups according to a group, and the step of dividing into the plurality of different downlink control information format groups according to the group comprises:

dividing all the downlink control information formats in different bandwidths and transmission modes into a plurality of downlink control information format groups with different overheads in accordance with overheads, wherein each downlink control information format group includes different numbers of information bits.

The downlink control information format group includes following signaling: a downlink control information format type bit, and a bit and a padding bit in the downlink control information format, wherein the number of padding bits is 0 or a positive integer, the downlink control information format type bit is used to indicate the downlink control information format type; all the downlink control information formats in the downlink control information format group achieve a same overhead by the padding bits.

In the step of the base station transmitting the physical downlink control channel bearing the downlink control information and the UE detecting the downlink control information, the base station transmitting the downlink control information according to the downlink control information format group filled with the padding bits; the UE detecting the received downlink control information in accordance with the downlink control information format group filled with the padding bits.

In the step of all the downlink control information formats in the downlink control information format group achieving the same overhead by the padding bits, when the physical downlink control channel on one downlink component carrier bears the downlink control information of a plurality of downlink carriers and the resource in the downlink control information format uses a type 2 resource representation method, the overhead of a downlink control information format with a small bandwidth is made to be the same as the overhead of the downlink control information format with a large bandwidth by filling padding bits; or when the physical downlink control channel on one downlink component carrier bears the downlink control information of a plurality of downlink carriers and the resource in the downlink control information format uses a type 0 or type 1 resource representation method, the overhead of a downlink control information format with a large bandwidth is made to be the same as the overhead of the downlink control information format with a small bandwidth by compressing the bits in the downlink control information with the large bandwidth; or the overhead of a downlink control information format with a large bandwidth is made to be the same as the overhead of the downlink control information format with a small bandwidth filled with padding bits by compressing the bits in the downlink control information with the large bandwidth.

The present invention further provides a system for transmitting downlink control information, comprising a base station and user equipments, wherein, the base station is configured to transmit a physical downlink control channel bearing corresponding downlink control information on each downlink component carrier in a user equipment's physical downlink shared channel carrier set when being not configured with a carrier indicator field;

the user equipment is configured to detect the corresponding downlink control information on each downlink component carrier in the physical downlink shared channel carrier set.

The base station is further configured to transmit the physical downlink control channel bearing the corresponding downlink control information on each downlink component carrier in the configured physical downlink shared channel carrier set when being configured with a carrier indicator field; said UE is also configured to detect the corresponding downlink control information on each downlink component carrier in a physical downlink control channel carrier set.

The base station is configured to divide all the downlink control information formats in different bandwidths and transmission modes into a plurality of downlink control information format groups with different overheads in accordance with overheads, wherein various downlink control information format groups contain different numbers of information bits.

The base station is configured to transmit the corresponding downlink control information on each downlink component carrier in the configured physical downlink control channel carrier set when being configured with the carrier indicator field;

said UE is configured to detect the corresponding downlink control information on a common search space and a UE-specific search space of each downlink component carrier in the configured physical downlink control channel carrier set; and/or detect the corresponding downlink control information on the common search space of backward compatible carriers and non-backward compatible carriers in the physical downlink shared channel carrier set.

The method and system for transmitting downlink control information in accordance with the present invention solve the problems that the number of blind detections increases due to the introduction of cross-carrier scheduling and carrier aggregation and how to transmit and detect the multi-carrier downlink control information, and so on, and thus are conducive to the implementation of the LTE-Advanced system.

PREFERRED EMBODIMENTS OF THE PRESENT INVENTION

To make the objects, technical schemes and benefits of the present invention clearer, the present invention will be further described in detail in the following with combination of the accompanying drawings.

According to the condition that the number of blind detections increases due to the introduction of cross-carrier scheduling and carrier aggregation in the LTE-Advanced system and there are no technical scheme for transmitting and detecting the multi-carrier downlink control information, the present invention provides a method and a system for transmitting downlink control information to implement to transmit and detect the multi-carrier downlink control information.

Figure 3:
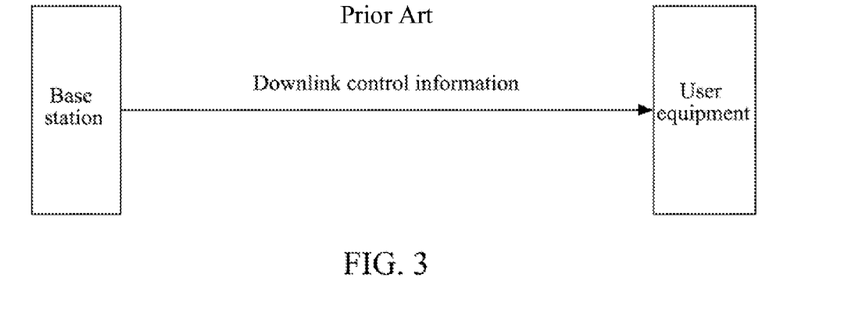
FIG. 3 is a schematic diagram of implementing to transmit the downlink control information according to the present invention.

As shown in FIG. 3, in the method for transmitting downlink control information in accordance with the present invention, the overall procedure for achieving the downlink control information transmission and detection is as follows:

when the base station is not configured with a carrier indicator field, the base station transmits a physical downlink control channel bearing the corresponding downlink control information on each carrier in the UE's physical downlink shared channel carrier set (the UE-specific downlink component carrier set), and a user equipment detects the corresponding downlink control information on each downlink component carrier in the downlink component carrier set, wherein the physical downlink shared channel carrier set is configured by the base station.

Preferably, when the base station is configured with a carrier indicator field, the base station transmits the corresponding downlink control information on each downlink component carrier in the configured PDCCH carrier set, and the UE only detects the corresponding downlink control information on each downlink component carrier in the configured PDCCH carrier set.

Preferably, when the base station is configured with a carrier indicator field, the base station transmits the corresponding downlink control information on each downlink component carrier in the configured PDCCH carrier set, and the UE detects the corresponding downlink control information in the common search space and the UE-specific search space of each downlink component carrier in the configured PDCCH carrier set;

and detects the corresponding downlink control information in the common search space of the backward compatible carriers and the non-backward compatible carriers in the PDSCH carrier set.

Preferably, the physical downlink control channel carrier set is a sub-set of backward compatible carriers and non-backward compatible carriers in the UE-specific downlink component carrier set.

Preferably, the physical downlink control channel carrier set is divided into the UE-specific DCI carrier set and the public DCI carrier set to respectively indicate the downlink component carriers of the UE-specific DCI and the public DCI that the UE needs to detect.

Preferably, the cross-carrier scheduling is configured by taking the component carrier as the unit, that is, the cross-carrier scheduled downlink component carrier and the non cross-carrier scheduled downlink component carrier can coexist.

Preferably, for the downlink component carrier that can be performed by cross-carrier scheduling, the UE-specific DCI Format of its common search space does not contain a carrier indicator field and only indicates the scheduling information of this carrier, alternatively, for the downlink component carrier that can be performed by cross-carrier scheduling, the common search space of this downlink component carrier does not bear the UE-specific DCI Format.

Preferably, for the downlink component carrier that can be performed by the cross-carrier scheduling, the DCI Format of its UE-specific search space includes the carrier indicator field.

Preferably, the corresponding DCI Format on the downlink component carrier to be detected is notified by the higher layer signaling, such as using the radio resource control RCC signaling notification.

Preferably, the search space of each downlink component carrier is determined by the search space method in the LTE R8; alternatively, the search space on each downlink component carrier of the R10 UE can be determined according to the index of the downlink component carrier.

Preferably, the R10 UE search space might be different from the R8 UE search space.

The base station configured with the carrier indicator field is equivalent to that the base station allows the target UE performing cross-carrier scheduling, and the base station not configured with the carrier indicator field is equivalent to that the base station does not allow the target UE performing cross-carrier scheduling.

The carrier indicator domain configuration (cross-carrier scheduling configuration) is a UE-specific configuration, that is, the carrier indicator field configurations of different UEs might be different.

In order to reduce the number of the blind detections and reduce the implementation complexity, the present invention provides the following processing ways for the downlink control information formats.

All the downlink control information formats (DCI Format) in different bandwidths and transmission modes are divided into k different DCI format groups according to the overhead (the number of information bits contained in the DCI Format), and the numbers of information bits contained in various DCI Format groups are different.

Preferably, all the DCI Formats in a DCI Format group are filled with padding bits to achieve the same overhead according to the fixed overhead, and the padding bits are used to make all the DCI Formats in the group have the same overhead.

Preferably, the signaling contained in the DCI Format group is the DCI Format type bits, and bits and padding bits in the DCI Format, wherein the padding bits are 0 or positive integers, and the DCI Format type bit represents the DCI Format type.

Preferably, the base station transmits downlink control information in accordance with the DCI Format group filled with padding bits, and the UE performs detection in accordance with the DCI Format group filled with the padding bits; during the transmission, the way for determining the carrier can refer to the description of carrier selection, and the group and carrier determination relationship can be determined with a way of blind detection.

Preferably, when the PDCCH on one downlink carrier can bear the downlink control information of a plurality of downlink carriers and the resource in the DCI Format indicates that the signaling (contained bits in the DCI Format) uses the type 2 resource representation method, the DCI Format with a small bandwidth is filled with padding bits to make the overhead of it to be consistent with the that of the DCI Format with a large bandwidth.

Preferably, when the PDCCH on one downlink carrier can bear the downlink control information of a plurality of downlink carriers and the resource in the DCI Format indicates that the signaling (contained bits in the DCI Format) uses the type 0/1 resource representation method, the DCI Format bit with a large bandwidth is compressed to make the overhead of it to be the same as that of the DCI Format with a small bandwidth, or, the DCI Format bit with a large bandwidth is compressed to make the overhead of it to be the same as that of DCI Format with a small bandwidth filled with the padding bits.

Based on the aforementioned transmission method shown in FIG. 3, the present invention also provides a system for transmitting downlink control information, and the system comprises a base station and user equipments, wherein the base station is configured to transmit the physical downlink control channel bearing the corresponding downlink control information on each carrier in the UE's physical downlink shared channel carrier set;

the UE is configured to detect the corresponding downlink control information on each downlink component carrier in the physical downlink shared channel carrier set.

Preferably, the base station is also configured to transmit the physical downlink control channel bearing the corresponding downlink control information on each downlink component carrier in the configured physical downlink control channel carrier set when being configuring with a carrier indicator field; correspondingly, said UE is also configured to detect the corresponding downlink control information on each downlink component carrier in the physical downlink control channel carrier set.

The downlink control information formats are divided into a plurality of different downlink control information format groups according to the group, and the specific division method is as follows.

All the downlink control information formats in different bandwidths and transmission modes are divided into a plurality of different downlink control information format groups with different overheads in accordance with the overhead, and each downlink control information format group contains different numbers of information bits.

When the base station is configured with the carrier indicator field, it transmits the corresponding downlink control information on each downlink component carrier in the configured physical downlink control channel carrier set; said UE detects the corresponding downlink control information in the common search space and the UE-specific search space of each downlink component carrier in the configured physical downlink control channel carrier set; the UE also detects the corresponding downlink control information on the common search space of the backward compatible carriers and the non-backward compatible carriers in the physical downlink shared channel carrier set.

Embodiment 1

When the base station is not configured with a carrier indicator field, the base station transmits a physical downlink control channel bearing the corresponding downlink control information on each carrier in a user equipment's physical downlink shared channel carrier set (the UE specific downlink component carrier set), and the UE detects the corresponding downlink control information on each downlink component carrier in the aforementioned downlink component carrier set;

when the base station is configured with a carrier indicator field, the base station transmits the corresponding downlink control information on each downlink component carrier in the configured PDCCH carrier set, and the UE only detects the corresponding downlink control information on each downlink component carrier in the configured PDCCH carrier set;

wherein the PDSCH carrier set and the PDCCH carrier set are configured by the base station.

The PDCCH carrier set is a sub-set of backward compatible carriers and non-backward compatible carriers in the UE-specific downlink component carrier set; the corresponding DCI Format on the downlink component carrier to be detected is notified by the higher layer signaling, such as the RCC signaling.

The cross-carrier scheduling is configured by taking the component carrier as the unit, that is, the cross-carrier scheduled downlink component carrier and the non cross-carrier scheduled downlink component carrier can coexist.

Embodiment 2

When the base station is not configured with a carrier indicator field, the base station transmits a physical downlink control channel bearing the corresponding downlink control information on each carrier in the UE's physical downlink shared channel carrier set (the UE specific downlink component carrier set), and the UE detects the corresponding downlink control information on each downlink component carrier in the physical downlink component carrier set;

when the base station is configured with a carrier indicator field, the base station transmits the corresponding downlink control information on each downlink component carrier in the configured PDCCH carrier set; the UE detects the corresponding downlink control information in the common search space and the UE-specific search space of each downlink component carrier in the configured PDCCH carrier set, and detects the corresponding downlink control information in the common search space of the backward compatible carriers and the non-backward compatible carriers in the PDSCH carrier set; here, it indicates that, when the base station is configured with the carrier indicator field, the PDCCH carrier set only defines downlink component carrier set of the UE specific DCI is transmitted in the UE-specific search space; the PDSCH carrier set defines the downlink component carrier set of the public DCI is transmitted in the common search space.

The PDSCH carrier set and the PDCCH carrier set are configured by the base station; the PDCCH carrier set is a sub-set of the backward compatible carriers and the non-backward compatible carriers in the UE-specific downlink component carrier set.

The corresponding DCI Format on the downlink component carrier to be detected is notified to the UE by the higher layer signaling by the base station, such as being configured with the RCC signaling.

The cross-carrier scheduling is configured by taking the component carrier as the unit, that is, the cross-carrier scheduled downlink component carrier and the non cross-carrier scheduled downlink component carrier can coexist.

Embodiment 3

The PDCCH carrier set is divided into UE-specific DCI carrier set and the public DCI carrier set to respectively represent the downlink component carriers of the UE-specific downlink control information and the public downlink control information that the user equipment needs to detect.

When the base station is not configured with the carrier indicator field, the base station transmits the PDCCH bearing the corresponding DCI on each carrier in the UE's PDSCH carrier set (UE specific downlink component carrier set), and the UE detects the corresponding downlink control information on each downlink component carrier in the downlink component carrier set.

When the base station is configured with the carrier indicator field, the base station transmits the corresponding DCI on each downlink component carrier in the configured PDCCH carrier set, and the UE detects the corresponding UE specific DCI in the UE-specific search space of each downlink component carrier in the configured UE-specific DCI carrier set, and the UE detects the corresponding public DCI in the common search space of each downlink component carrier in the configured public DCI carrier set.

The cross-carrier scheduling is configured by taking the component carrier as the unit, that is, the cross-carrier scheduled downlink component carrier and the not cross-carrier scheduled downlink component carrier can coexist.

Embodiment 4

The search space on each downlink component carrier is determined with the LTE R8 search space method;

or, for the R10 UE, the search space on each downlink component carrier can be determined according to the index of the downlink component carrier.

For the cross-carrier scheduled downlink component carrier, the UE-specific DCI Format of its common search space does not contain the carrier indicator field and only indicates the scheduling information of this carrier, alternatively, the common search space of the downlink component carrier does not bear the UE-specific DCI Format.

For the cross-carrier scheduled downlink component carrier, the DCI Format of its UE-specific search space contains the carrier indicator field to indicate the scheduling information of other downlink component carriers to perform the cross-carrier scheduling.

Embodiment 5

The R10 UE search space might be different from the R8 UE search space.

In the common search space, the LTE R8 detects PDCCH Formats with four CCEs 4 times and PDCCH Formats with 8 CCEs twice. In the UE-specific search space, PDCCH Formats with one CCE are detected 6 times, PDCCH Formats with 2 CCEs are detected 6 times, PDCCH Formats with four CCEs are detected twice, and PDCCH Formats with 8 CCEs are detected twice.

For the R10 UE, the search space on the downlink component carrier to be detected might further be extended. In the common search space, PDCCH Formats with 4 CCEs are detected (4+k1) times, PDCCH Formats with 8 CCEs are detected (2+k2) times. In the UE-specific search space, PDCCH Formats with one CCE are detected (6+k3) times, PDCCH Formats with two CCEs are detected (6+k4) times, PDCCH Formats with four CCEs are detected (2+k5) times, and PDCCH Formats with 8 CCEs are detected (2+k6) times, wherein the values of k1, k2, k3, k4, k5 and k6 are positive integers or 0.

The values of k1, k2, k3, k4, k5 and k6 of the cross-carrier scheduled downlink component carrier and the non cross-carrier scheduled downlink component carrier might be different.

Embodiment 6

All the DCI Formats in different bandwidths and transmission modes are divided into k different DCI format groups according to the overhead (the number of information bits contained in the DCI Format), and the numbers of information bits contained in various DCI Format group are different; wherein the DCI Formats can be divided into groups first, and then the number of padding bits can be determined according to the amount of overheads in the group.

All the DCI Formats in one DCI Format group are filled with the padding bits according to the fixed overhead to achieve the same overhead.

Different DCI Formats in the same DCI Format group are distinguished through the public signaling in the DCI Format group.

The base station transmits the DCI according to the DCI Format group filled with the padding bits, and the UE performs detection according to the DCI Format group filled with the padding bits.

The signaling contained in the DCI Format group is the DCI Format type bits, and the bits and padding bits in the DCI Format, wherein the padding bits are 0 or positive integers.

Embodiment 7

When the PDCCH on one downlink carrier can bear the downlink control information of a plurality of downlink carriers, the resource in the DCI Format indicates that the signaling uses the type 2 resource representation method, and the padding bits of the DCI Format with a small bandwidth makes the overhead of the DCI Format with a small bandwidth to be consistent with that of the DCI Format with a large bandwidth.

When the PDCCH on one downlink carrier can bear the downlink control information of a plurality of downlink carriers, and the resource in the DCI Format indicates that the signaling uses the type 0/1 resource representation method, and the DCI Format bit with a large bandwidth is compressed to make the overhead of it to be the same as that of the DCI Format with a small bandwidth.

Or, when the PDCCH on one downlink carrier can bear the downlink control information of a plurality of downlink carriers, the resource in the DCI Format indicates that the signaling uses the type 0/1 resource representation method, and the DCI Format bit with a large bandwidth is compressed to make the overhead of it to be the same as that of the DCI Format with a small bandwidth.

The large bandwidth is divided into k blocks in accordance with the size of the small bandwidth, and then signaling is used to indicate the index of the selected block, and then signaling is used to indicate the resource allocation within the block.

It should be noted that, the UE-specific downlink control information format of the common search space of the downlink component carrier mentioned in the aforementioned embodiment is: the downlink component carrier format detected by the UE in the common search space of the downlink component carrier.

One person having ordinary skill in the art should understand that all or parts of the steps in the aforementioned method might be implemented with programs instructing the relevant hardware, and the programs might be stored in computer readable storage mediums, such as a Read-Only-Memory, a magnetic disk, or an optical disk and so on. Optionally, all or parts of the steps of the aforementioned embodiment might be implemented with one or more integrated circuits. Correspondingly, each module/unit in the aforementioned embodiment might be implemented either with hardware or software function module. The present invention is not intended to limit the combination of any specific form of hardware and software.

The above description is only the preferred embodiment of the present invention and is not intended to limit the present invention, and for those skilled in the field, the present invention has a variety of modifications and variations. Without departing from the spirit and essence of the present invention, all these types of modifications, equivalences or variations should belong to the scope of the claims of the present invention.

INDUSTRIAL APPLICABILITY

By transmitting or detecting the downlink control information on the downlink component carrier in the PDCCH or PDSCH carrier sets, the method and system for transmitting downlink control information in accordance with the present invention solve the problems that the number of blind detections increases due to the introduction of cross-carrier scheduling and carrier aggregation and how to transmit and detect the multi-carrier downlink control information, and so on, and thus are conducive to the implementation of the LTE-Advanced system.

What is claimed is:

1. A method for transmitting downlink control information, comprising: a base station configuring a physical downlink shared channel carrier set (PDSCH carrier set) for a user equipment (UE); when said base station determining it is not configured with a carrier indicator field, the base station transmitting a physical downlink control channel (PDCCH) on each downlink component carrier within said physical downlink shared channel carrier set (PDSCH carrier set); said physical downlink control channel (PDCCH) bearing corresponding downlink control information;

and said UE detecting the corresponding downlink control information on said each downlink component carrier within the physical downlink shared channel carrier set (PDSCH carrier set);

and when said base station determining it is configured with the carrier indicator field, the base station further configuring a physical downlink control channel carrier set (PDCCH carrier set), and transmitting a physical downlink control channel on each downlink component carrier within said configured physical downlink control channel carrier set (PDCCH carrier set); said physical downlink control channel (PDCCH) bearing the corresponding downlink control information; and said UE detecting the corresponding downlink control information on said each downlink component carrier within the physical downlink control channel carrier set (PDCCH carrier set).

2. The method of claim 1, wherein
the physical downlink control channel carrier set is a subset of backward compatible carriers and non-backward compatible carriers in a UE-specific downlink component carrier set; or
the physical downlink control channel carrier set is divided into a UE-specific downlink control information carrier set and a public downlink control information carrier set to respectively indicate the downlink component carriers of the UE-specific downlink control information and public downlink control information that the UE needs to detect.

3. The method of claim 1, wherein when the base station is configured with a carrier indicator field, in the step of the base station transmitting the physical downlink control channel bearing the corresponding downlink control information on said each downlink component carrier in the configured physical downlink control channel carrier set,
the base station transmits the corresponding downlink control information on said each downlink component carrier in the configured physical downlink control channel carrier set;
in the step of the user equipment detecting the corresponding downlink control information on said each downlink component carrier in the physical downlink control channel carrier set,
the UE detecting the corresponding downlink control information in a common search space and a UE-specific search space of said each downlink component carrier in the configured physical downlink control channel carrier set.

4. The method of claim 3, wherein in the step that the UE detects the corresponding downlink control information on said each downlink component carrier in the physical downlink shared channel carrier set,
the UE detecting the corresponding downlink control information on the common search space of backward compatible carriers and non-backward compatible carriers in the physical downlink shared channel carrier set.

5. The method of claim 1, wherein in the step that the base station transmits the physical downlink control channel bearing the corresponding downlink control information,
if the downlink component carrier is performed by cross-carrier scheduling, the component carrier is configured by taking a component carrier as a unit in the cross-carrier scheduling.

6. The method of claim 5, wherein for the cross-carrier scheduled downlink component carrier, the downlink control information format of the common search space of the downlink component carrier does not contain the carrier indicator field and only indicates the downlink component carrier scheduling information, and the downlink control information format of the UE-specific search space of the downlink component carrier contains the carrier indicator field; or for the cross-carrier scheduled downlink component carrier, the common search space of the downlink component carrier does not bear the UE-specific downlink control information format; the downlink control message format of the UE-specific search space of the downlink component carrier contains the carrier indicator field.

7. The method of claim 1, wherein in the step that the UE detects the downlink control information,
a search space of each downlink component carrier is determined by a search space method in a Long Term Evolution Release 8 (LTE R8) standard; alternatively,
if the UE is a LTE R10 standard UE, the search space on each downlink component carrier of the LTE R10 standard UE is determined according to an index of the downlink component carrier.

8. The method of claim 1, wherein a format of the corresponding downlink control information on a downlink component carrier to be detected is notified to the UE by the base station using higher layer signaling; or
the downlink control information format is divided into a plurality of different downlink control information format groups according to a group, and the step of dividing into the plurality of different downlink control information format groups according to the group comprises:
dividing all the downlink control information formats in different bandwidths and transmission modes into a plurality of downlink control information format groups with different overheads in accordance with overheads, wherein each downlink control information format group includes different numbers of information bits.

9. The method of claim 8, wherein
the downlink control information format group includes following signaling: a downlink control information format type bit, and a bit and a padding bit in the downlink control information format, wherein the number of padding bits is 0 or a positive integer, the downlink control information format type bit is used to indicate the downlink control information format type; all the downlink control information formats in the downlink control information format group achieve a same overhead by the padding bits.

10. The method of claim 9, wherein in the step of the base station transmitting the physical downlink control channel bearing the downlink control information and the UE detecting the downlink control information,
the base station transmitting the downlink control information according to the downlink control information format group filled with the padding bits; the UE detecting the received downlink control information in accordance with the downlink control information format group filled with the padding bits.

11. A system for transmitting downlink control information, comprising a base station and user equipments, wherein, the base station is configured to configure a physical downlink shared channel carrier set (PDSCH carrier set) for a user equipment (UE); when said base station determining it is not configured with a carrier indicator field, the base station transmits a physical downlink control channel (PDCCH) on each downlink component carrier within said physical downlink shared channel carrier set (PDSCH carrier set); said physical downlink control channel (PDCCH) bearing corresponding downlink control information; the user equipment is configured to detect the corresponding downlink control information on said each downlink component carrier within said physical downlink shared channel carrier set (PDSCH carrier set); and the base station is further configured to, when said base station determining it is configured with the carrier indicator field, the said base station further configures a physical downlink control channel carrier set (PDCCH carrier set), and transmits a physical downlink control channel on each downlink component carrier within said physical downlink control channel carrier set (PDCCH carrier set); said physical downlink control channel (PDCCH) bearing the corresponding downlink control information; the UE is further configured to detect the corresponding downlink control information on said each downlink component carrier in said physical downlink control channel carrier set (PDCCH carrier set).

12. The system of claim 11, wherein the base station is configured to divide all the downlink control information formats in different bandwidths and transmission modes into a plurality of downlink control information format groups with different overheads in accordance with overheads, wherein various downlink control information format groups contain different numbers of information bits.

13. The system of claim 12, wherein the base station is configured to transmit the corresponding downlink control information on said each downlink component carrier in the configured physical downlink control channel carrier set when being configured with the carrier indicator field; the UE is configured to detect the corresponding downlink control information on a common search space and a UE-specific search space of said each downlink component carrier in the configured physical downlink control channel carrier set; and/or detect the corresponding downlink control information on the common search space of backward compatible carriers and non-backward compatible carriers in the physical downlink shared channel carrier set.

* * * * *